United States Patent Office 3,356,354
Patented Dec. 5, 1967

3,356,354
APPARATUS FOR DRYING AND HARDENING WELDING ELECTRODE COATINGS
Anatoly Nikolaevich Beljaev, B. Serpookhovskaja St., 22-a, Apt. 4, Podolsk, Moscow Region, U.S.S.R., and Ivan Stepanovich Shilov, Zavodskaja St., 9/1, Apt. 8, Klimovsk 1, Moscow Region, U.S.S.R.
Filed June 2, 1964, Ser. No. 371,960
5 Claims. (Cl. 266—5)

The present invention relates to a method of and apparatus for drying and hardening arc welding electrode coatings by means of high-frequency induction heating.

According to the known methods, the drying and hardening of the arc welding electrode coatings are performed by heating the latter in several time cycles. The devices which serve for accomplishing the known methods, comprise high-frequency inductors, a drying-quenching chamber and a conveyer to move the electrodes. In such a device the electrodes successively move through the inductors which are located some distance apart.

When passing through the successive inductor, the electrodes are heated to a comparatively high temperature, but on moving further, however, they are cooled, emitting the heat to the coating up to the moment they reach the next inductor after which the process is repeated.

In the known devices, it is impossible to maintain the preset heating cycle time and the even heating of the electrodes throughout the whole length thereof. Sharp fluctuations of temperature, which arise with the employment of this method involve the cracking of the electrode coating which is difficult to avoid. The mechanical strength remains low, whereas the moisture content is quite high.

The object of the present invention is to eliminate the above-mentioned disadvantages.

The primary object of the present invention is to provide a method of drying and hardening electrode coatings by means of high-frequency heating of the electrode rods for ensuring a high quality coating (mechanical strength, wetfastness and the absence of cracks).

It is a further object of the invention to provide an apparatus for carrying out the method described.

This problem can be solved by drying and hardening the welding electrode coatings through the use of high-frequency heating in the present invention, with the drying and hardening being performed continuously up to the hardening temperature in one and a single means effecting the preset heating cycle both throughout the length of each electrode and for each separate electrode of a group regardless of the working rate thereby providing a high quality of coating.

The problem can also be solved by an apparatus comprising a drying-quenching chamber, a conveyer for moving the electrodes and an inductor parallel non-cooled bars sectioned in length, the surface current density of one section being greater than that of the foregoing section, thereby ensuring the preset heating cycle time. The bars are sectioned in width, with the surface current density in the extreme or outer bars being one and a half that of the middle bars thus providing the preset heating cycle time.

A capacitor with a capacitance selected according to the current stabilization regardless of the inductor loading is cut in the inductor current supply circuit.

The drying-quenching chamber consists of heating and cooling sections with a common air circulation system as a result of which power is saved.

The conveyer and bar inductor follow a zigzag path, which makes the apparatus quite compact and the conveyer moving the electrodes between the inductor bars is of the chain type with the pair of links thereof carrying spring clamps for holding the electrodes. The drums are provided with slots for receiving the electrodes and with a face tracer for controlling the spring clamps for loading and unloading the conveyer with the electrodes.

The bars of the inductor are of an alloy including aluminium—93.4%, copper—3.9%, magnesium—1.8% and manganese—0.9% so that the temperature of the bars can be kept within 80–90° C. Thus the method and apparatus ensures the high quality of coating, the preset heating cycle time and the even heating of the electrodes through the whole length thereof.

Further objects and advantages of the invention will become more readily apparent to persons skilled in the art from the following detailed description and annexed drawings and in which drawings.

Figure 2:
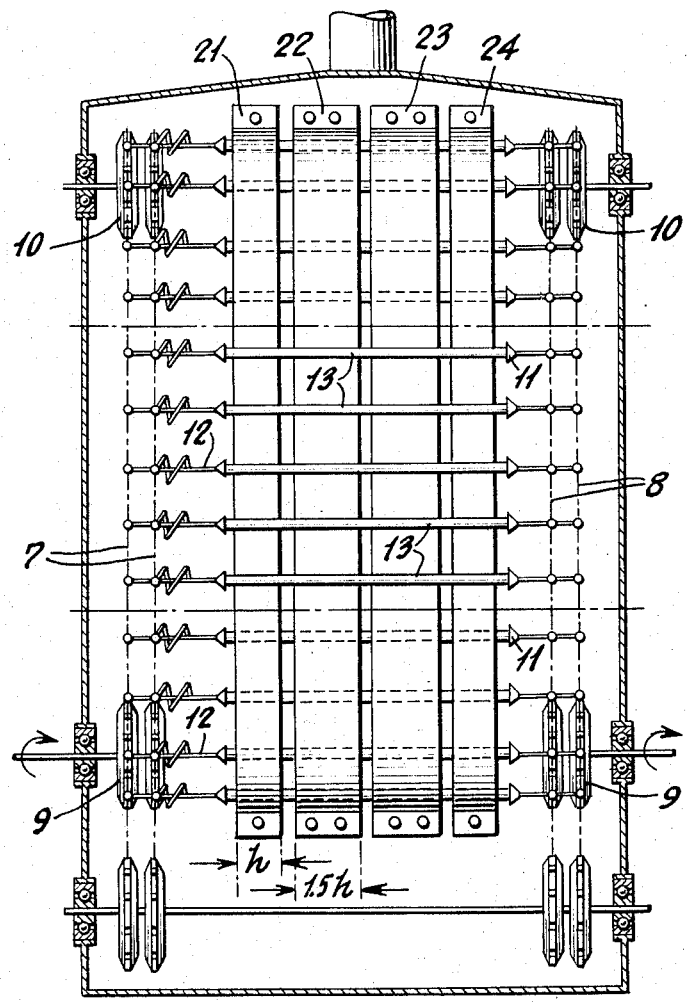
FIG. 2 is a view taken along line A—A of FIG. 1, the view looking in the direction of the arrows and being on a larger scale.

Referring more particularly to the drawings the main components include: the drying-quenching chamber provided with heating section 1 and cooling section 2, chain conveyer means 3 following a zigzag path, sectional bar inductor means 4 following the zigzag path and loading and unloading means denoted generally 5 and 6 respectively. The chain conveyer consists of two closed duplex strand roller chains 7 and 8 (FIG. 2) operably related to drive and idler pulleys 9 and 10 respectively. Fixed clamps 11 and movable spring clamps 12 are secured to the chain conveyer for holding electrodes 13.

Figure 1:
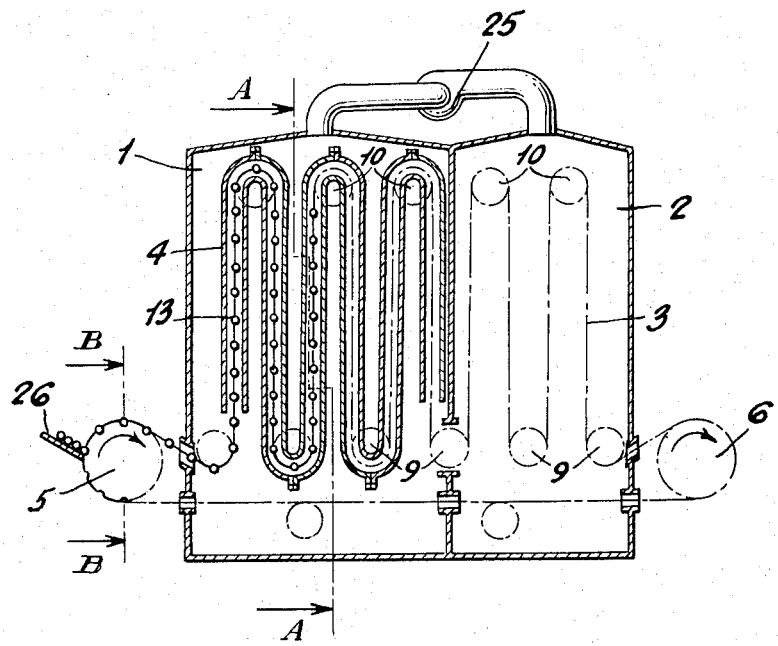
FIG. 1 is a diagrammatic view in side elevation of an embodiment of the invention.
Figure 3:
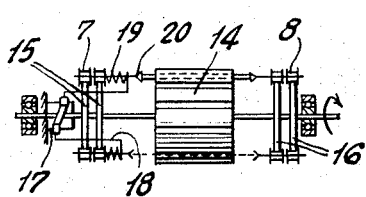
FIG. 3 is a view taken along line B—B of FIG. 1, the view looking in the direction of the arrows.

The loading of the chain conveyer with the electrodes is effected via loading means 5 which consists of drum 14 provided with axially extending slots for receiving the electrodes (FIG. 3), sprocket wheels 15 and 16 carrying the conveyer chains 7 and 8, butt-tracer 17 and movable rods 18 each having forks at their ends to compress springs 19 of electrode holders 20. The structural details of the unloading means 6 are similar to those of the loading means 5.

The inductor 4 consists of four parallel bars 21, 22, 23, 24, and it will be seen that the width of bars 21 and 24 outermost is one and a half the width of the middle or innermost bars 22 and 23. The bars are preferably of an alloy having aluminium—93.4%, copper—3.9%, magnesium—1.8% and manganese—0.9%.

While the operation of the apparatus is believed apparent, it may be summarized as follows:

From the electrode coating press the damp electrodes 13 are delivered to a tray 26 and during rotation of the loading means 5 the electrodes are lodged in the slots of the drum 14. As a result of the movable spring release due to the action of the butt tracer 17 being actuated by the rods 18 the electrodes when moving forward are clamped by the fixed clamps 11 and movable spring clamps 12 of the conveyer.

With the chain conveyer being moved further, the electrodes travel through the heating section 1 of the drying-quenching chamber, and the passage of the electrodes between the bars of inductor means 4, causes the electrodes to be gradually heated to the hardening temperature. The electrodes should be held in the heating section for 7–15 minutes depending upon the composition and thickness of the coating. After the thermal treating cycle the electrodes move through the cooling section 2 and then to the unloading means 6.

The unloading means 6 functions so that with the chain conveyer travelling thereover, the chain clamps are released thus releasing the electrodes which lie free in the slots of the drum 14 for transmittal to the packing machines.

The heating section 1 and cooling section 2 are interconnected by a single air circulation system with a fan 25 to save the power and the air exchange with the ambient air is effected by special slide gate valves.

Figure 4:
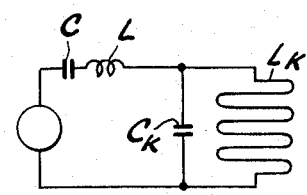
FIG. 4 is a diagrammatic view of the connection between the inductor and high-frequency converter.

FIG. 4 diagrammatically shows the connection between the inductor and high frequency converter. The capacitance of the capacitor can be determined from the equation $$C = \frac{C_k}{\omega^2 L C_k - 1}$$

by which the parametrical stabilization of current in the heating inductor is ensured.

Also, provision is made to avoid the application of the electrode holding spring clamps if other types of electrode holders for the chain conveyer (e.g. a permanent magnet) are used.

While we have shown and described the electrodes as moving horizontally, it is possible to effect the drying hardening of the electrode coatings with the electrodes positioned vertically. As an alternative to the above, a modification of the apparatus in the form of a horizontally closed chain conveyer provided with socket holders in which the cleared ends of the electrodes were placed has been tested. The inductor should be mounted over the conveyer and the electrodes moved through the split formed by the parallel bars of the inductor.

The advantage of this modification lies in a more simple design of the conveyer though this necessitates the application of additional mechanisms for moving the electrodes from the coating press to the drying-hardening assembly.

The invention is not to be confined to any strict conformity to the showings in the drawings but changes and modifications may be made therein so long as such changes or modifications mark no material departure from the spirit and scope of the appended claims.

What we claim is:

1. An apparatus for drying and hardening the coating of welding electrodes with high frequency current comprising a treatment chamber, air circulating means for the chamber, inductor means for heating the electrodes mounted within the chamber, said inductor means including a plurality of spaced apart bars defining coils within the chamber, the width of the outermost bars of the inductor means being such that the surface current density thereof is approximately 1.5 times higher than the surface current density of the middle bars thereby producing a uniform high frequency electromagnetic field for effecting heat treatment along the entire length of the electrode, a supply circuit for the inductor means, means for maintaining invariable temperature conditions in the inductor means defined by a capacitor connected in the supply circuit and having a capacity such as to maintain stable current regardless of the number of electrodes in the inductor means, and means for conveying electrodes along the coils of the inductor means.

2. The apparatus as claimed in claim 1 in which said bars are divided into sections, the length of the coils in each section being such that the surface current density in the coils of a successive section is higher than the surface current density in the previous section.

3. The apparatus as claimed in claim 1, in which the coils of the inductor means are Duralumin alloy.

4. The apparatus as claimed in claim 1 in which the electrode conveying means includes a chain conveyer corresponding to the configuration of the inductor means and spring-loaded electrode clamp means carried by each pair of links of the chain conveyer.

5. The apparatus as claimed in claim 4 including a rotatable drum having axially extending grooves for receiving electrodes located at the entrance end of the chain conveyer for loading electrodes onto the conveyer, end face follower means controlling operation of the clamp means, and a similar rotatable drum and follower means at the discharge end of the conveyor chain for unloading the electrodes.

References Cited

UNITED STATES PATENTS

| | | | |
|---|---|---|---|
| 2,423,902 | 7/1947 | Peterson | 219—10.69 |
| 2,465,897 | 3/1949 | Marien et al. | 219—10.69 X |
| 2,491,687 | 12/1949 | Nutt | 219—10.69 X |
| 2,504,815 | 4/1950 | Detuno et al. | 219—10.69 X |
| 2,640,141 | 5/1953 | Vore et al. | 219—10.69 X |
| 2,725,450 | 11/1955 | Kuhne et al. | 219—10.69 |
| 2,779,848 | 1/1957 | Bosomworth et al. | 219—10.69 |
| 2,871,332 | 1/1959 | Northmore et al. | 219—10.69 |

FOREIGN PATENTS

| | | |
|---|---|---|
| 705,172 | 3/1954 | Great Britain. |
| 1,381,710 | 11/1964 | France. |

JOHN F. CAMPBELL, *Primary Examiner.*

RICHARD M. WOOD, *Examiner.*

J. CLINE, L. H. BENDER, *Assistant Examiners.*